(12) United States Patent
Corey et al.

(10) Patent No.: US 6,213,531 B1
(45) Date of Patent: Apr. 10, 2001

(54) EXTENDABLE SLEEPER FOR A TRUCK

(75) Inventors: Jeffrey S. Corey, Krum; William C. Kahn, Denton; Frank H. Schneck, Jr., Corinth, all of TX (US); Charles L. Cook, Thackerville, OK (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/456,635

(22) Filed: Dec. 8, 1999

(51) Int. Cl.$^7$ ..................................................... B62C 1/06
(52) U.S. Cl. ..................... 296/26.09; 296/26.08; 296/190.02
(58) Field of Search ............................ 296/26.08, 26.09, 296/190.02, 26.12, 26.13

(56) References Cited

U.S. PATENT DOCUMENTS

| | | | |
|---|---|---|---|
| 3,558,180 | 1/1971 | Algire | 296/23 |
| 3,711,146 * | 1/1973 | Madzsar et al. | 296/1 S |
| 3,834,752 * | 9/1974 | Cook et al. | 296/1 S |
| 4,036,519 * | 7/1977 | Servais et al. | 296/1 S |
| 4,121,684 | 10/1978 | Stephens et al. | 180/89.14 |
| 4,156,543 * | 5/1979 | Taylor et al. | 296/1 S |
| 4,201,415 | 5/1980 | Suchanek | 296/190 |
| 4,221,424 | 9/1980 | Eiserman et al. | 296/146 |
| 4,300,785 * | 11/1981 | Mettetal | 280/432 |
| 4,351,554 | 9/1982 | Miller | 296/24 R |
| 4,378,856 | 4/1983 | Miller | 180/89.14 |
| 4,397,496 * | 8/1983 | Drygas, III | 296/1 S |
| 4,438,943 * | 3/1984 | Hebert | 280/432 |
| 4,518,188 * | 5/1985 | Witten | 296/1 S |
| 4,781,516 * | 11/1988 | Cripe et al. | 414/555 |
| 4,787,670 | 11/1988 | Bentz | 296/190 |
| 4,826,235 | 5/1989 | Zwick | 296/170 |
| 4,904,015 * | 2/1990 | Haines | 296/180.3 |
| 4,913,485 | 4/1990 | Moffatt et al. | 296/190 |
| 4,934,727 * | 6/1990 | Hawkins et al. | 280/423.1 |
| 4,948,326 * | 8/1990 | Bedard | 414/541 |
| 4,977,631 | 12/1990 | Bretz | 5/118 |
| 4,989,281 | 2/1991 | Christensen | 5/118 |
| 4,993,088 | 2/1991 | Chudik | 5/118 |
| 5,078,448 * | 1/1992 | Selzer et al. | 296/180.2 |
| 5,083,834 | 1/1992 | Moffatt et al. | 296/190 |
| 5,123,669 * | 6/1992 | Ducote | 280/426 |
| 5,170,521 | 12/1992 | Light | 5/118 |
| 5,190,342 * | 3/1993 | Marlowe et al. | 280/423.1 |
| 5,303,947 * | 4/1994 | Gerber | 280/423.1 |
| 5,310,239 | 5/1994 | Koske et al. | 296/190 |
| 5,375,879 | 12/1994 | Williams et al. | 280/749 |
| 5,432,963 | 7/1995 | Coral et al. | 5/118 |
| 5,560,673 | 10/1996 | Angelo | 296/190 |
| 5,598,591 | 2/1997 | Kelley | 5/118 |
| 5,638,560 | 6/1997 | Rigdon et al. | 5/118 |
| 5,735,568 | 4/1998 | Arnold | 296/190 |

* cited by examiner

Primary Examiner—D. Glenn Dayoan
Assistant Examiner—Hilary Gutman
(74) Attorney, Agent, or Firm—Sidley & Austin

(57) ABSTRACT

An extendable sleeper for a truck that has a fixed portion and an extension. The extension is slidably connected to the fixed portion for horizontal longitudinal movement with respect thereto. The fixed portion is defined by rigid sleeper sidewalls, and is adapted for attaching to a rear portion of a truck cab. The extension has rigid extension sidewalls and a rigid rear panel. The movement of the extension with respect to the fixed portion causes the extendable sleeper to move between a stored configuration and a deployed configuration. In the stored configuration, at least part of the extension is located inside the fixed portion. In the deployed configuration, at least another part of the extension is extending behind the fixed portion such that the sleeper has a relatively greater enclosed volume. The extendable sleeper may further incorporate a bed, a table, retractable furniture, a retractable platform, a storage compartment, windows, a safety lock, a safety alarm system, or a power actuator for moving the extension.

28 Claims, 5 Drawing Sheets

EXTENDABLE SLEEPER FOR A TRUCK

TECHNICAL FIELD OF THE INVENTION

The current invention relates to a sleeper for use on trucks or similar motor vehicles. In one aspect, it relates to a sleeper having a rearwardly extendable extension for changing the useful volume enclosed within the sleeper.

BACKGROUND OF THE INVENTION

It is well known to provide trucks with sleepers, i.e., enclosed compartments situated behind the driver's seat and accessible from the truck cab. Sleepers typically include one or more bunks for sleeping and frequently contain additional space for amenities such as tables, chairs, storage closets and other furniture. Generally speaking, making a sleeper longer is desirable because it provides the driver with more space. However, the length of current sleepers is limited by two considerations, namely, swing clearance requirements and overall vehicle length restrictions, as further described below.

Swing clearance requirements relate to the fact that trucks used for hauling semi-trailers in a tractor-trailer combination are typically equipped with a semi-trailer attachment apparatus known as a fifth wheel. Mounted on the rear frame of the truck, the fifth wheel receives and secures a kingpin mounted on the underside of the semi-trailer to provide a pivotal connection between the truck and semi-trailer. This pivotal articulation allows the tractor-trailer combination to be much more maneuverable than a non-articulated vehicle of similar length. However, when the tractor-trailer combination is in a turning configuration, the front corners of the semi-trailer pivot about the kingpin center, causing one or the other of the corners to move forward along an arc toward the back of the truck cab or, if the truck is so-equipped, toward the back of the truck sleeper. The generally D-shaped area through which the front corners of the semi-trailer move when the tractor-trailer combination turns define the so-called "swing-clearance area." Presently, the positioning of the sleeper or other truck components within the swing-clearance area is avoided to prevent possible interference between the sleeper and semi-trailer during turns. This is true even though the swing clearance area need only be avoided when the tractor-trailer combination is in a turning configuration (e.g., while operating the tractor-trailer combination). When the tractor-trailer combination is in a substantially straight configuration (e.g., while parked), the swing clearance area is typically unused free space.

Some states and countries have laws or regulations that restrict the overall length of a tractor-trailer combination which can operate in their jurisdictions. Because the primary purpose of a tractor-trailer combination is to haul large loads of goods, it may be desirable to maximize the length of the semi-trailer to accommodate larger loads. Hence, to accommodate long trailers it is currently necessary to limit the length of the sleeper to comply with local length restrictions while maintaining adequate swing-clearance between the sleeper and the semi-trailer.

Therefore, a need exists for a sleeper that can provide the driver with additional interior space which does not increase the overall vehicle length or compromise the swing clearance area when the truck is in motion.

SUMMARY OF THE INVENTION

It is an object of the current invention to provide a truck sleeper for use in a tractor-trailer combination which can have increased interior space when the tractor-trailer combination is at rest, but which does not compromise the swing clearance area when the tractor-trailer combination is in motion.

It is another object of the current invention to provide a truck sleeper for use in a tractor-trailer combination which can have increased interior space without increasing the overall length of the tractor-trailer combination.

In accordance with one aspect of the present invention, an extendable truck sleeper is provided having a fixed portion and a movable extension. The extension is slidably connected to the fixed portion so as to allow fore-and-aft movement with respect thereto. The fixed portion is defined by rigid sleeper sidewalls, and is adapted for attaching to a rear portion of a truck cab. The extension has rigid extension sidewalls and a rigid rear panel. The fore-and-aft movement of the extension with respect to the fixed portion causes the extendable sleeper to move between a stored configuration and a deployed configuration. In the stored configuration, at least part of the extension is located inside the fixed portion. In the deployed configuration, at least another part of the extension extends behind the fixed portion such that the sleeper has a relatively greater enclosed volume and longitudinal length.

In accordance with another embodiment of the present invention, the extendable sleeper may accommodate an occupant when the extendable sleeper is in the stored configuration and in the deployed configuration. In further embodiments, the extendable sleeper may incorporate one or more of the following amenities, in any combination: a bed, a foldable bed, retractable furniture, a retractable platform adapted to be a table or a bed extension, a storage compartment, windows, a safety lock, a safety alarm system, a safety engine kill switch, a drivetrain deactivation safety system, or a power actuator for moving the extension.

In yet another embodiment, the extendable sleeper may be incorporated into a tractor-trailer combination such that the extension of the sleeper occupies the swing clearance area when in the deployed configuration, and the extension does not occupy the swing clearance area when in the stored configuration.

In accordance with another aspect of the present invention, the useful volume within a truck sleeper may be changed by longitudinally sliding an extension of the sleeper from a stored configuration to a deployed configuration. The extension has rigid extension sidewalls and a rigid rear panel. In the stored configuration, the extension is at least partially inside a fixed portion of the sleeper. In the deployed configuration, the extension is extending at least partially behind the fixed portion. In another embodiment of the present invention, the useful volume within a truck sleeper may be further changed by retracting the extension from the deployed configuration back to the stored configuration. In a preferred embodiment, the longitudinal sliding may be effected by an electric actuator. In other embodiments, hydraulic or pneumatic actuators may be used for the longitudinal sliding. Also, the extension in the deployed configuration may occupy at least a portion of the swing clearance area.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

Figure 1:
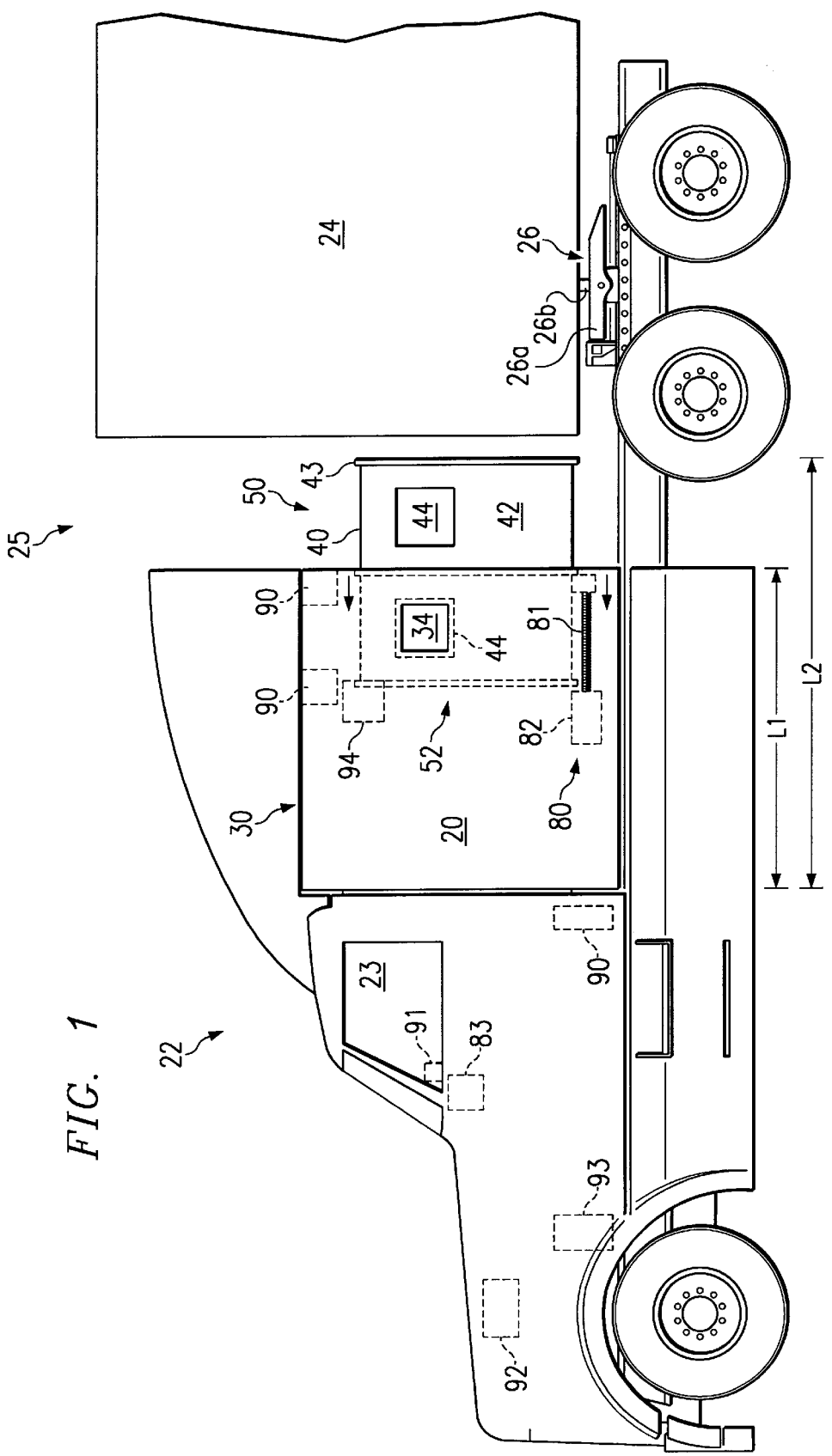
FIG. 1 is a side view showing a tractor-trailer combination having an extendable sleeper according to one possible embodiment of the current invention.

Referring now to the drawings, wherein like reference numbers are used to designate like elements throughout the various views, several embodiments of the current invention are further described.

FIGS. 1–3a show an extendable sleeper 20 according to one possible embodiment of the current invention installed on a truck 22. The truck 22 is connected to a semi-trailer 24 to form a tractor-trailer combination 25. FIG. 1 shows a side view of the tractor-trailer combination 25 having the extendable sleeper 20 attached. The sleeper 20 comprises a fixed portion 30 and a movable extension 40. The fixed portion 30 is connected to the rear of the driver's compartment 23 in a conventional manner to provide access to the sleeper. The extension 40 is slidably connected to the fixed portion 30 for horizontal longitudinal movement with respect thereto. In the preferred embodiment, the extension 40 is mounted such that it slides within a similarly shaped section of the fixed portion 30 in a telescoping manner. The extension 40 may thus be moved fore and aft with respect to the fixed portion 30, causing a portion of the extension to move from within the fixed portion to outside the fixed portion. Stated another way, the fore and aft movement of extension 40 with respect to the fixed portion 30 causes the sleeper 20 to change between a stored configuration (shown by phantom lines 52) having a length L1 and having relatively less enclosed volume, and a deployed configuration 50 having a length L2 and having a relatively larger enclosed volume. An important aspect of the current invention is that when the sleeper 20 is incorporated into a tractor-trailer combination, the sleeper can be placed into its stored configuration 52 having a reduced length L1 such that no part of the sleeper occupies the clearance area between the sleeper 20 and the semi-trailer 24.

Figure 2:
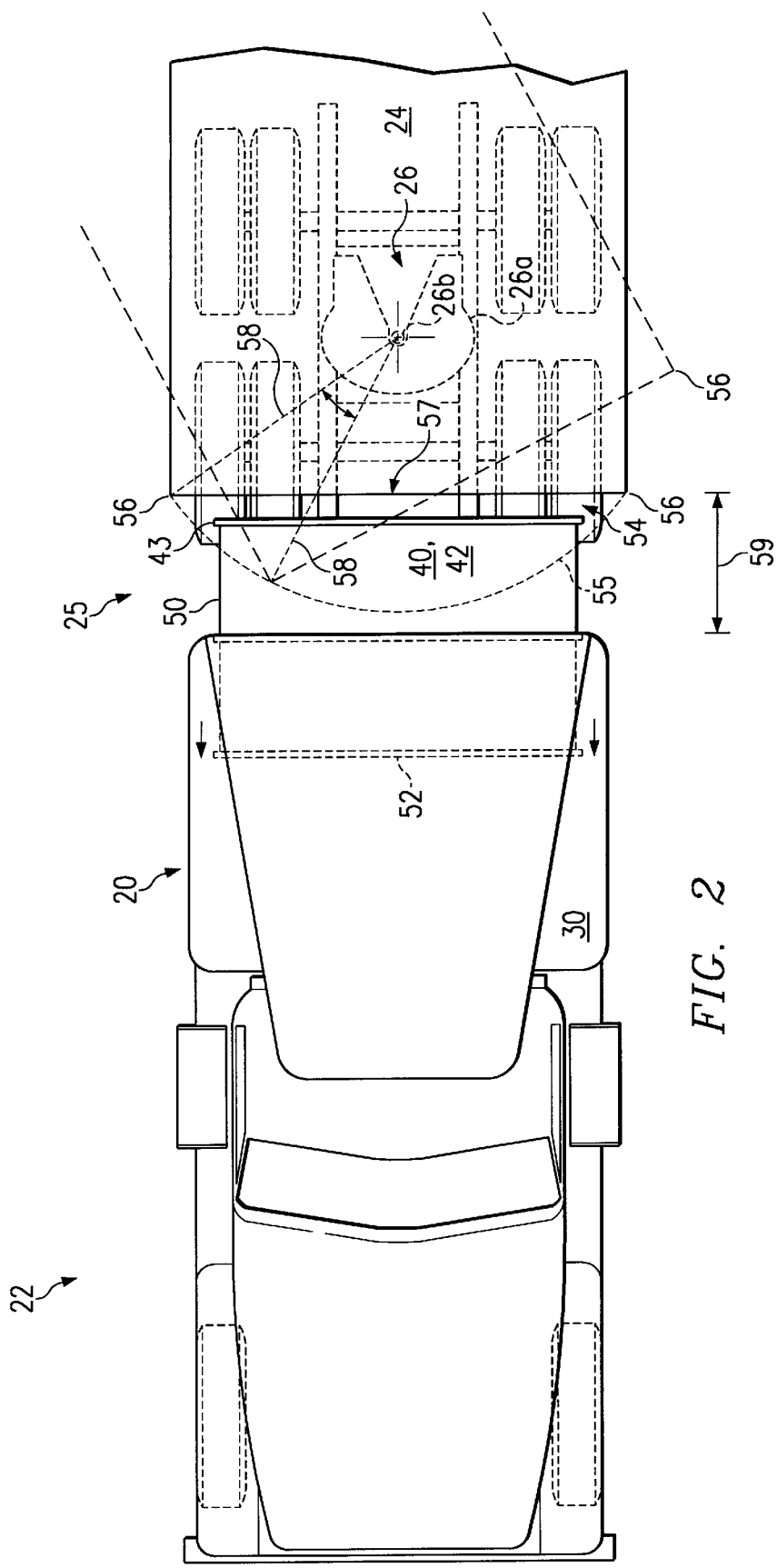
FIG. 2 is a top view showing the tractor-trailer combination of FIG. 1.

FIG. 2 is a top view of the tractor-trailer combination 25 shown in FIG. 1. The semi-trailer 24 is connected to the truck 22 by a fifth wheel 26 in a typical tractor-trailer configuration. A swing clearance area 54 is defined by an arc 55 traveled by the front corners 56 of the semi-trailer 24 as they pivot about the fifth wheel 26 (e.g., as when the tractor-trailer combination 25 is in a turning configuration, which is illustrated by the broken line showing of semi-trailer 24 in FIG. 2). Often the swing clearance area 54 will be D-shaped because most conventional semi-trailers are rectangular, having a flat leading edge 57 and two front corners 56 at an equal radial distance 58 from the fifth wheel 26. When the tractor-trailer combination 25 is in motion, the swing clearance area 54 typically must be clear of obstructions to allow the tractor-trailer combination to turn a corner without having interference between the semi-trailer 24 and the sleeper 20. When the tractor-trailer combination 25 is at rest in a straight configuration as shown in FIG. 2, there is free space (denoted by ref. number 59) between the back of the fixed portion 30 of the sleeper and semi-trailer 24. Likewise, when the truck does not have a semi-trailer 24 connected, there is free space behind the fixed portion 30 of sleeper 20. Another important aspect of the current invention is that the extendable sleeper 20 utilizes such free space 59 to increase the volume enclosed within the sleeper. Thus, the extension 40 may occupy some or all of the swing clearance area 54 in its deployed configuration 50, but remains clear of the swing clearance area in its stored configuration 52.

Figure 3A:
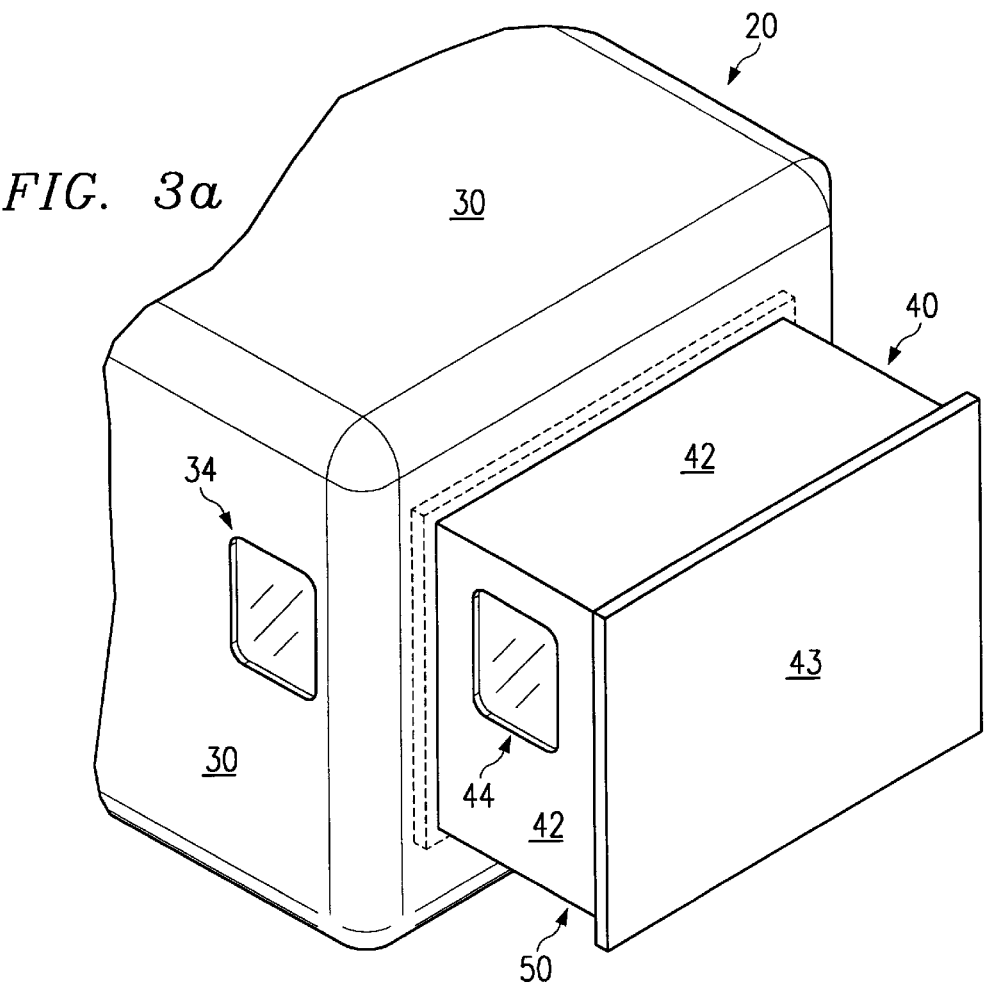
FIG. 3a is an enlarged rear perspective view showing the extendable sleeper of FIGS. 1 and 2.

FIG. 3a shows an enlarged rear perspective view of the extendable sleeper 20 of FIGS. 1 and 2 in its deployed configuration 50. Yet another important aspect of the current invention is that the walls and panels of the fixed portion 30 and the extension 40 are rigid. The extension volume is defined by extension sidewalls 42 and an extension rear panel 43, which may be formed from various materials, including but not limited to: plastic, fiberglass composites, carbon-fiber composites, kevlar composites, wood, steel, and aluminum. The extension 40 may have various shapes and sizes. For example, if the extension 40 of a possible embodiment has a generally rectangular shape defining its volume (as in FIGS. 1–8), such extension would have extension sidewalls 42 comprising a flat bottom, two flat sides, a flat top, and a flat rear panel. In other possible embodiments, the extension sidewalls 42 may form other geometric cross-sectional shapes, including but not limited to being generally: round or elliptical (one continuous sidewall); D-shaped (two sidewalls); square, rectangular, or rectangular having rounded corners (four sidewalls); or pentagonal (five sidewalls). Similarly, the fixed portion 30 may have various shapes and sizes made from a variety of rigid materials.

Figure 3B:
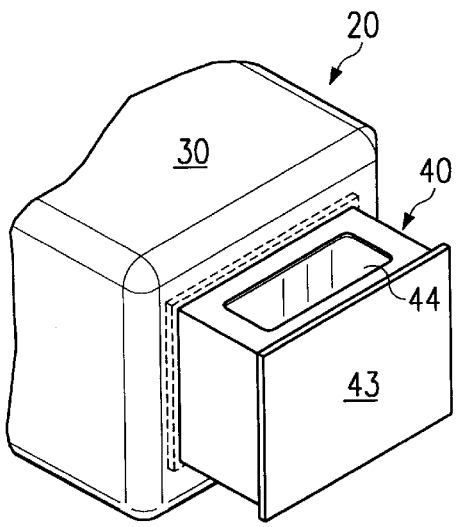
FIG. 3b is a reduced view, similar to FIG. 3a, showing another possible embodiment of the current invention.
Figure 3C:
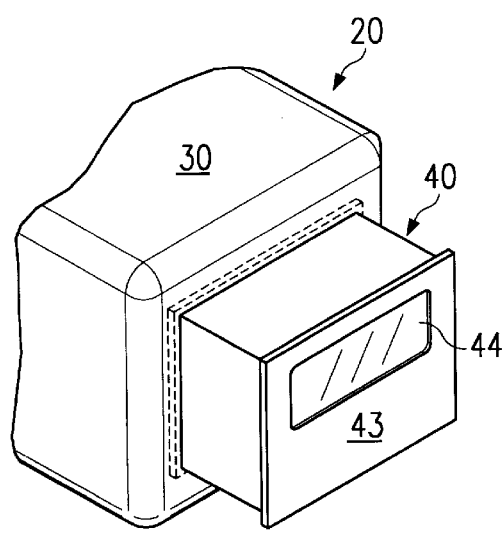
FIG. 3c is a reduced view, similar to FIG. 3a, showing yet another possible embodiment of the current invention.

The extension 40 may have an extension window 44 located in an extension sidewall 42. Such extension window 44 may be located on the lower, upper, and/or lateral extension sidewalls 42. The embodiment shown in FIGS. 1 and 3a has an extension window 44 located on a lateral extension sidewall 42. As shown in FIG. 3b, another possible embodiment of this invention may have an extension window 44 on the upper extension sidewall 42 to act as a sunroof or moonroof when in the deployed configuration. FIG. 3c shows yet another possible embodiment of this invention having an extension window 44 located on the rear panel 43 to act as a rear view window in either the stored 52 or deployed configurations 50.

The fixed portion 30 also may have a fixed portion window 34. As best seen in FIG. 1, the positions of the extension window 44 and the fixed portion window 34 can be selected such that the windows 34, 44 are operably aligned when the sleeper 20 is in the stored configuration 52. Such alignment may allow an occupant within the extension 40 to look outside of the extendable sleeper 20 via the aligned windows when the extendable sleeper is in a stored configuration 52. Other possible embodiments may not have these windows aligned in the stored configuration 52, or may have windows in only the fixed portion 30 or only the extension 40. Hence, there are many possible combinations of window locations and positions, with or without multiple windows aligning.

Figure 4:
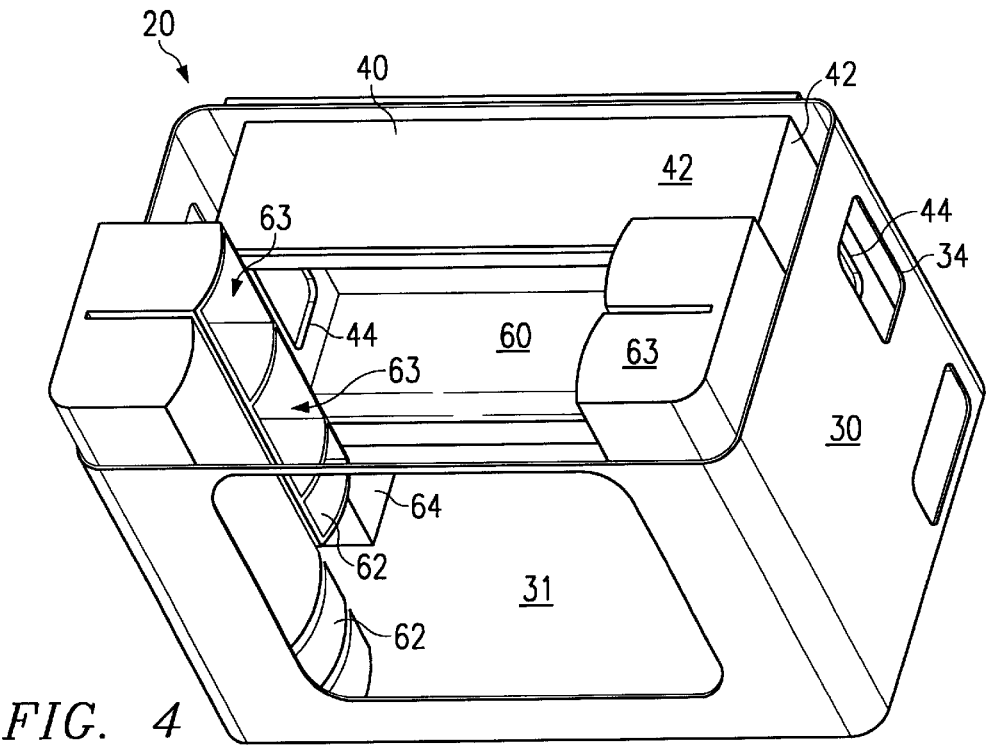
FIG. 4 is an isometric view, with portions broken away for illustration, showing an extendable sleeper in a stored configuration according to another embodiment of the current invention.
Figure 5:
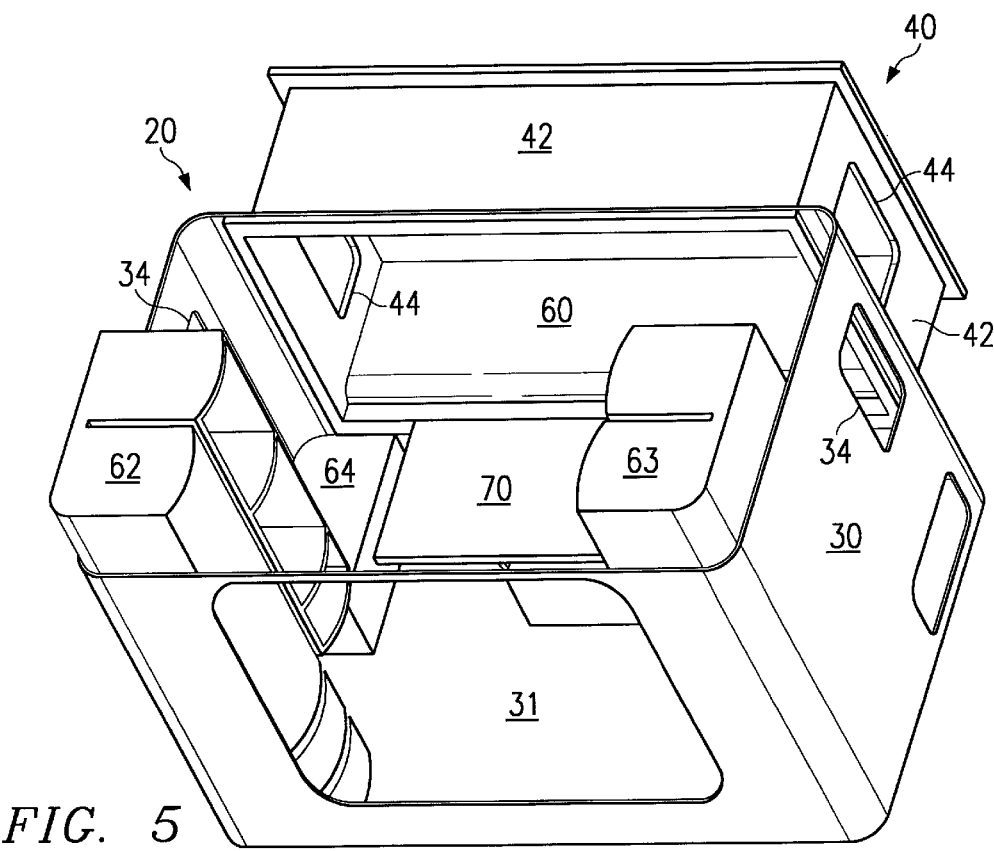
FIG. 5 shows the extendable sleeper of FIG. 4 in a deployed configuration.
Figure 6:
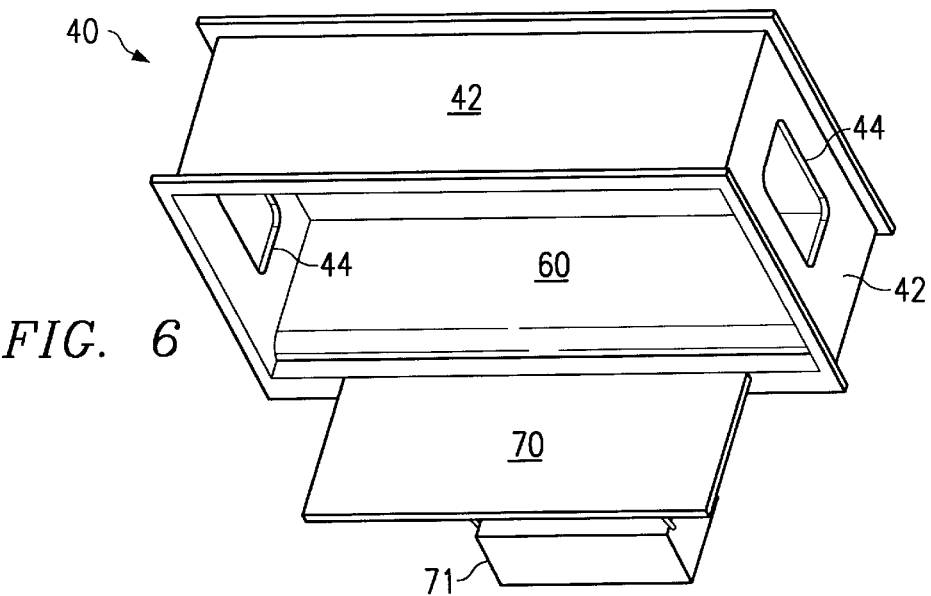
FIG. 6 is an isometric view of the extension of the extendable sleeper of FIGS. 4 and 5.

FIGS. 4–6 relate to another possible embodiment of the current invention. FIGS. 4 and 5 are perspective views of an extendable sleeper 20 with the roof of the fixed portion 30 removed for purposes of illustration. FIG. 4 shows the extendable sleeper 20 in the stored configuration 52 having at least a portion of the extension 40 located inside the fixed portion 30. FIG. 5 shows the extendable sleeper 20 in the deployed configuration 50 having at least another portion of the extension 40 extending behind and outside the fixed portion 30.

Various embodiments of the current invention may have various and numerous furniture, amenities, appliances, and fixtures formed within or attached to the extension 40 and/or the fixed portion 30. Such furniture may include but is not limited to a: bed, hammock, table, book stand, television stand, stereo stand, sofa, couch, bench seat, and chair. Also, various embodiments may incorporate other amenities, appliances, or household-type fixtures, such as but not limited to a: shelf, storage compartment, lamp, television, VCR, receiver/amplifier unit, DVD, CD, speaker, computer, video game console, refrigerator, microwave oven, toaster oven, shower, sink, and toilet. Such furniture, amenities, appliances, or fixtures may be accessible or useable in only stored configuration 52, in only deployed configuration 50, or in both the stored and deployed configurations.

For example, the embodiment shown in FIGS. 4–6 has a bed 60 within the extension 40. The bed 60 may accommodate an occupant in both the deployed configuration 50 and the stored configuration 52. Also, the bed may act as either a sleeping surface or a sitting surface, depending on the height of the extension 40. In another possible embodiment, the extension may have a plurality of beds (e.g., bunk beds). Still another possible embodiment may have several beds within both the fixed portion 30 and the extension 40.

FIGS. 4 and 5 also show the fixed portion 30 having shelves 62, storage compartments 63, and a bench seat 64 therein. In addition, a platform 70 is mounted to the lower sidewall 31 of the fixed portion 30. The platform 70 is adapted for vertical movement between a stored configuration (see FIG. 4) having the platform positioned under at least a portion of the extension 40 when the sleeper is in the stored configuration 52 and a deployed configuration (see FIG. 5) having the platform 70 occupying at least a portion of the volume previously occupied by the extension 40 when the sleeper was in the stored configuration 52. The platform 70 may lower into its stored configuration beneath the extension 40 by having legs 71 (FIG. 6) with folding joints, and when the extension 40 is deployed the platform 70 may stand-up within the volume occupied by the extension in the stored configuration 52 by extending the folding legs 71, as shown in FIG. 6. The platform top surface 70 may be level with or above the inside surface of the lower extension sidewall 42. But, other possible embodiments may have a platform 70, fixed or moveable, that remains lower than the inside surface of the lower extension sidewall 42, or even lower than the entire extension 40. In such other possible embodiments the platform 70 is below at least a portion of the extension 40 in the stored configuration 52 and a large portion of the platform is adjacent to the extension in the deployed configuration 50.

The platform 70 shown in FIGS. 5 and 6 may act as a table; thus allowing an occupant to sit at the table using the bench seat 64 when the extension 40 is in the deployed configuration 50. In another possible embodiment, the platform 70 may be approximately the same length as the bed 60 and act as a bed extension. In such embodiment, the bed 60 is a foldable bed that may be unfolded onto the platform 70 when the extension 40 is in the deployed configuration 50. Thus, the platform 70 may provide support for the unfolded bed 60 and thereby increase the size of the bed in the deployed configuration 50. The foldable bed 60 may be configured such that it can be used to accommodate an occupant in both the folded configuration when the extension 40 is in the stored configuration 52, and in the unfolded configuration when the extension is in the deployed configuration 50.

The embodiment of FIGS. 4–6 also has extension windows 44 and fixed portion windows 34 on both the left and right sides of the extendable sleeper 20. Similar to the embodiment shown in FIGS. 1–3a, the embodiment of FIGS. 4–6 has the extension windows 44 substantially operably aligned with the sleeper windows 34 when in a stored configuration (FIG. 4).

Also shown in FIGS. 4 and 5, the volume within the extension 40, as well as within the sleeper 20, may accommodate an occupant when the extension is in both the stored configuration (FIG. 4) and the deployed configuration (FIG. 5). Thus, an occupant of such embodiment may sleep on the bed 60, and access the shelves 62 and storage compartments 63 in both the stored and deployed configurations.

Figure 7:
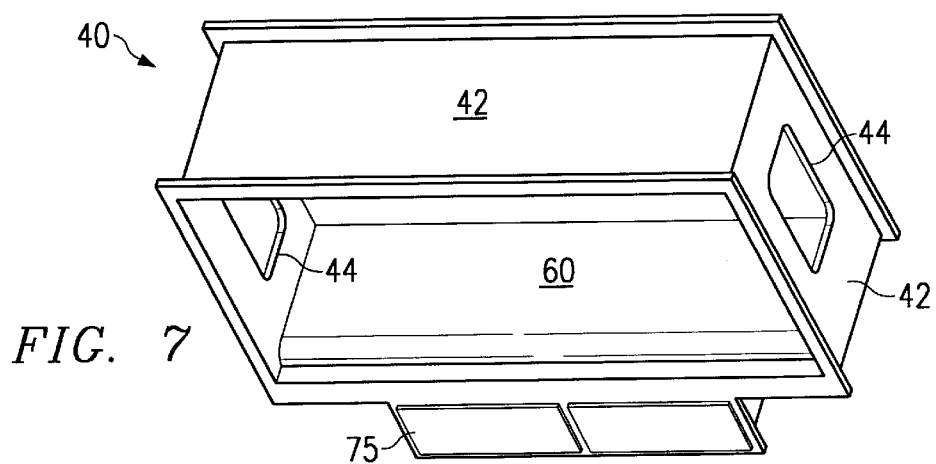
FIG. 7 is an isometric view, similar to FIG. 6, showing another embodiment of the extension.

FIG. 6 is a further view of the extension 40 of the embodiment of FIGS. 4 and 5 along with the platform 70 in the deployed configuration 50. FIG. 7 shows another possible extension 40, which may be substituted into the sleeper 20 of FIGS. 4 and 5 in place of the extension 40 and platform 70 shown in FIG. 6 to form an additional embodiment of the invention.

The extension 40 of FIG. 7 has a bed 60 therein and a storage compartment 75 attached thereto. The storage compartment 75 may be integrally formed within the extension 40, or it may be attached by various means, including but not limited to a: bracket, hook and loop fastener, bolt, screw, adhesive, bonded connection, snap, interlocking joint, and welded connection. The storage compartment 75 may be accessible when the extendable sleeper 20 is in only the stored configuration 52, only the deployed configuration 50, or in both the stored and deployed configurations. There are many possible types of storage compartments 75 that may be incorporated in a possible embodiment, including but not limited to a: shelf, entertainment center, closet, drawer, underbunk storage compartment, chest, pantry, change holder, phone holder, music/video media holder, ash tray, and trash can. The embodiment shown in FIG. 7 incorporates an underbunk storage compartment 75. Other embodiments may have a storage compartment 75 attached to or formed in any of the extension sidewalls 42 (e.g., upper, lower, or lateral) or rear panel 43, and on any surface of the extension sidewalls or rear panel (e.g., inside, outside, or both surfaces). Likewise, other embodiments may have storage compartments 75 attached to or formed in any of walls of the fixed portion 30.

Figure 8:
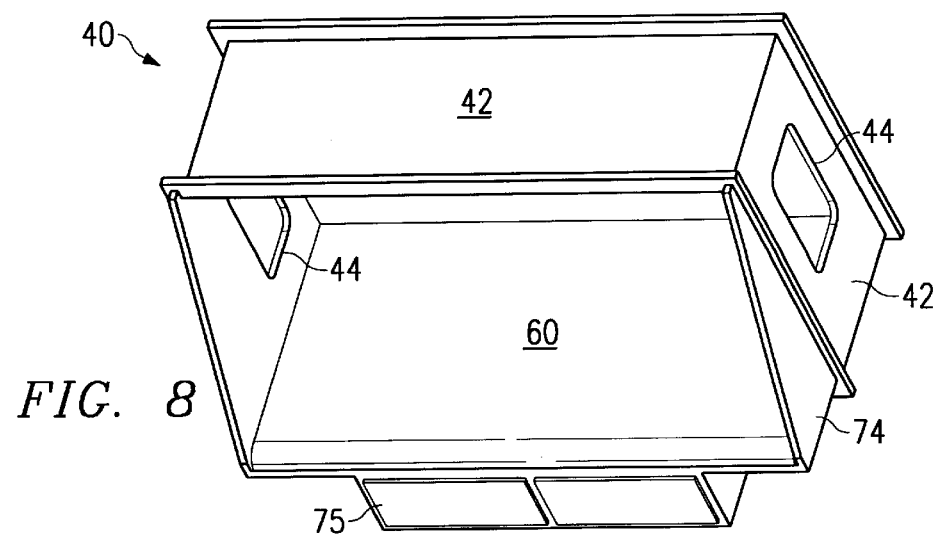
FIG. 8 is an isometric view, similar to FIG. 6, showing yet another embodiment of the extension.

FIG. 8 shows yet another embodiment of the extension 40, which also may be substituted into the embodiment of FIGS. 4 and 5 in place of the extension 40 and platform 70 shown in FIG. 6. The embodiment of FIG. 8 has a fixed bed extension 74 allowing for a relatively wider bed 60. Also, the embodiment shown in FIG. 8 has an underbunk storage compartment 75 similar to the one shown in FIG. 7.

Other possible embodiments of the extendable sleeper 20 may have various power-assisted or mechanically-assisted means for deployment and retraction of the extension 40 between the stored configuration 52 and the deployed configuration 50. For example, referring again to FIG. 1, a powered actuator 80 is provided in the truck. The powered actuator 80 has a lead screw 81 driven by an electric motor 82 for sliding the extension 40 between the stored configuration 52 and the deployed configuration 50. Other embodiments may have multiple actuators 80 with multiple lead screws 81 and/or multiple motors 82. Such powered actuator 80 may be controlled by an occupant of the truck 22 using a switch (not shown) mounted on one of the truck consoles 83, or using a switch mounted within the extendable sleeper 20. Other possible embodiments may have a pneumatic or hydraulic motor in place of the electric motor 82 within the powered actuator 80, or a manually-operated mechanical actuator may be used in place of, or in addition, to the powered actuator 80. Such various power-assisted or mechanically-assisted means for deploying and retracting the extension 40, as well as others, will be known to one skilled in the art.

To avoid problems which may result from operating a tractor-trailer combination 25 while also having the extension 40 deployed and occupying the swing clearance area 54, the extendable sleeper 20 according to some embodiments of the current invention may incorporate safety devices to detect and alert the truck occupants of, or to prevent, such conditions. The embodiment shown in FIG. 1 includes a safety alarm system 90 incorporating a bell, horn, buzzer, and/or indicator light 91 which operates if the extension 40 is not in the stored configuration 52 when the truck ignition is on, thereby indicating that the extension 40 may be occupying the swing clearance area 54. In another embodiment, a safety device is provided having a safety alarm system 90 that monitors whether the extension 40 is occupying the swing clearance area 54 and/or alerts a truck occupant of such when the tractor-trailer combination 25 is in motion. Still another possible safety device may be a safety engine kill switch 92 that can prevent the truck engine from running when the extension 40 is not in the stored configuration 52, thereby preventing the truck 22 from operating when the extension is occupying the swing clearance area 54. Yet another possible safety device may be a drivetrain deactivation safety system 93 that can prevent the truck drivetrain from propelling the truck 22 when the extension 40 is not in the stored configuration 52. Another possible safety device may have a safety lock 94 that can prevent the extension 40 from sliding out of the stored configuration 52 when the truck 22 is in motion. Other various safety devices for detecting, indicating, or preventing the extension 40 from occupying the swing clearance area 54 when the truck is being operated would be within the scope of the current invention. The examples given herein merely illustrate a few of the possible safety measures. Hence, there may be many other safety measures and devices that may be incorporated into an embodiment of the extendable sleeper 20 to detect, indicate, or prevent the extension 40 from occupying the swing clearance area 54 when the tractor-trailer combination 25 is in motion.

It will be appreciated by those skilled in the art having the benefit of this disclosure that this invention provides a extendable sleeper and method of varying the useful volume enclosed within a truck sleeper. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An extendable sleeper for a truck having an engine, a drivetrain, and a vehicle ignition, the extendable sleeper comprising:

a fixed portion defined by rigid sleeper sidewalls, said fixed portion being adapted for attaching to a rear portion of a truck cab;

an extension having rigid extension sidewalls and a rigid rear panel, said extension being slidably connected to said fixed portion for horizontal and longitudinal movement with respect thereto; and a safety device to operatively alert an operator when the extendable sleeper is in a position other than a stored configuration, wherein movement of said extension with respect to said fixed portion causes said extendable sleeper to move between said stored configuration, having at least a portion of said extension located inside said fixed portion, and a deployed configuration, having at least another portion of said extension extending behind said fixed portion, such that said extendable sleeper has a relatively greater enclosed volume.

2. An extendable sleeper in accordance with claim 1, wherein the volume within said extension can accommodate an occupant when said extendable sleeper is in said stored configuration and in said deployed configuration.

3. An extendable sleeper in accordance with claim 1, further comprising a bed located within said extension.

4. An extendable sleeper in accordance with claim 1, further comprising a platform mounted to a lower sidewall of said fixed portion, said platform being adapted for vertical movement between a stored configuration, having said platform positioned under at least a portion of said extension, and a deployed configuration having said platform occupying at least part of the volume occupied by said extension when said extendable sleeper is in said stored configuration.

5. An extendable sleeper in accordance with claim 4, wherein said platform is adapted to be a table.

6. An extendable sleeper in accordance with claim 4, further comprising a foldable bed located within said extension, wherein said platform is adapted to be a bed extension whereby at least a portion of said bed can be unfolded onto and supported by said platform when said extendable sleeper is in said deployed configuration.

7. An extendable sleeper in accordance with claim 1, further comprising a storage compartment attached to said extension.

8. An extendable sleeper in accordance with claim 7, wherein said storage compartment is accessible when said extendable sleeper is in said stored configuration and in said deployed configuration.

9. An extendable sleeper in accordance with claim 1, further comprising furniture attached to said extendable sleeper, wherein said furniture is adapted for vertical movement between a stored configuration having said furniture positioned under at least a portion of said extension when said extendable sleeper is in said stored configuration and a deployed configuration having said furniture occupying at least a portion of the volume occupied by said extension when said extendable sleeper is in said stored configuration.

10. An extendable sleeper in accordance with claim 1, further comprising an extension window located on said extension.

11. An extendable sleeper in accordance with claim 10, further comprising a fixed portion window located on said fixed portion.

12. An extendable sleeper in accordance with claim 11, wherein the locations of said extension window and said fixed portion window are selected such that said windows are operably aligned when said extendable sleeper is in said stored configuration.

13. An extendable sleeper in accordance with claim 1, wherein said extension occupies a swing clearance area when said extendable sleeper is in said deployed configuration, and said extension does not occupy said swing clearance area when said extendable sleeper is in said stored configuration.

14. An extendable sleeper in accordance with claim 1, further comprising a safety lock adapted to prevent said extension from sliding out of said stored configuration when said truck is in motion.

15. An extendable sleeper in accordance with claim 1, further comprising a safety alarm system adapted to warn a truck occupant that said extension is not in said stored configuration when said truck is in motion.

16. An extendable sleeper in accordance with claim 1, wherein the safety device is a safety alarm system that signals when said extendable sleeper is in a position other than said stored configuration and said vehicle ignition is activated.

17. An extendable sleeper in accordance with claim 1, wherein the safety device is a safety engine kill switch that prevents said engine of said truck from running when said extendable sleeper is in a position other than said stored configuration.

18. An extendable sleeper in accordance with claim 1, wherein the safety device is a drivetrain deactivation safety system adapted to prevent said drivetrain of said truck from propelling said truck when said extendable sleeper is in a position other than said stored configuration.

19. An extendable sleeper in accordance with claim 1, further comprising a powered actuator for moving said extension with respect to said fixed portion.

20. An extendable sleeper in accordance with claim 19, wherein said powered actuator comprises at least one lead screw driven by at least one electric motor.

21. An extendable sleeper in accordance with claim 19, wherein said powered actuator comprises at least one lead screw driven by at least one hydraulic motor.

22. An extendable sleeper in accordance with claim 19, wherein said powered actuator comprises at least one lead screw driven by at least one pneumatic motor.

23. A truck for use with a trailer, the truck comprising:
a chassis;
an operator's compartment, supported by the chassis;
a fifth wheel assembly, supported by the chassis, which is capable of releasably engaging a trailer kingpin; and
a sleeping compartment, accessible from the operator's compartment, having an extendable portion, the extendable portion is extendable from within the sleeping compartment,
wherein when the extendable portion is in an extended position, a usable volume of the sleeping compartment is greater than the usable volume when the extendable portion is in a fully retracted position,
wherein when the fifth-wheel assembly engages the trailer kingpin, a swing clearance area is defined between the sleeping compartment and the trailer, and
wherein when the fifth-wheel assembly engages the trailer kingpin and the extendable portion is in the extended position, the extendable portion occupies at least a portion of the swing clearance area.

24. A truck having an engine, a drivetrain, and a vehicle ignition, the truck comprising:
a chassis;
an operator's compartment, supported by the chassis;
a sleeping compartment, which is accessible from the operator's compartment;
an extendable structure, horizontally and longitudinally extendable from the sleeping compartment, whereas when the extendable structure is in an extended position, a usable volume of the sleeping compartment is greater than the usable volume when the extendable structure is in a fully retracted position; and
a safety device to alert an operator when the extendable structure is in a position other than said retracted position.

25. A truck in accordance with claim 24, wherein the safety device is an alarm system, such system being adapted to effect a signal when said extendable structure is in a position other than said retracted position and the vehicle ignition is activated.

26. A truck in accordance with claim 24, wherein the safety device is an engine kill switch, such switch being adapted to prevent the engine from operating when the extendable structure is in a position other than said retracted position.

27. A truck in accordance with claim 24, wherein the safety device is a drivetrain deactivation system, such system being adapted to prevent the drivetrain from driving the truck to effect motion thereof when the extendable structure is in a position other than said retracted position.

28. A truck in accordance with claim 24, wherein the truck is adapted for use with a trailer having a fifth-wheel coupling, whereas the truck further comprises a fifth wheel coupling, supported by the chassis, which is capable of releasably engaging a complementary trailer coupling,
wherein when the fifth-wheel coupling engages a complementary trailer coupling, a swing clearance area is defined between the sleeping compartment and the trailer, and
wherein when the fifth-wheel coupling engages the complementary trailer coupling of the trailer and when the extendable structure is in a position other than said retracted position, the extendable structure occupies at least a portion of the swing clearance area.

* * * * *